United States Patent [19]

Ladage et al.

[11] 4,065,267

[45] Dec. 27, 1977

[54] MANUFACTURE OF ALKYLATED UREA OR MELAMINE FORMALDEHYDE WITH IN-PROCESS ALCOHOL RECOVERY

[75] Inventors: Lawrence Ladage, Muskego, Wis.; Hilary E. Holste, Lower Burrell, Pa.

[73] Assignee: PPG Industries, Inc., Pittsburgh, Pa.

[21] Appl. No.: 722,979

[22] Filed: Sept. 13, 1976

Related U.S. Application Data

[62] Division of Ser. No. 541,744, Jan. 17, 1975.

[51] Int. Cl.$^2$ ............................................. B01D 3/00
[52] U.S. Cl. ...................................... 23/263; 23/260; 260/70 A; 203/38; 202/158
[58] Field of Search ............... 23/263, 260; 260/70 A; 203/38; 202/158

[56] References Cited

U.S. PATENT DOCUMENTS

| | | | |
|---|---|---|---|
| 1,394,232 | 10/1921 | Stevens | 23/263 X |
| 2,260,111 | 10/1941 | Caldwell | 23/263 |
| 2,260,890 | 10/1941 | Edgar | 260/70 A |
| 3,392,150 | 7/1968 | Groll | 260/70 A X |

Primary Examiner—James H. Tayman, Jr.
Attorney, Agent, or Firm—Carl T. Severini; Frank J. Troy

[57] ABSTRACT

This invention relates to an improved apparatus for preparing alkylated urea or melamine formaldehyde resins from alcohols having a boiling point higher than water, which apparatus permits the return of substantially dry alcohol from the water distillation system to the reactor.

The apparatus comprises a reactor connected to a fractionating column, having a rectifying section above a stripping section, at the junction of the rectifying section and the stripping section; a reboiler at the bottom of the fractionating column, which returns substantially dry alcohol to the reactor; a condenser which condenses the alcohol-water vapor mixture exiting the rectifying section of the column; and a separator device which separates the condensed mixture into an alcohol phase and a water phase, and from which the alcohol phase is returned to the top portion of the column.

Use of the apparatus of the invention results in a substantial reduction in reaction times.

3 Claims, 1 Drawing Figure

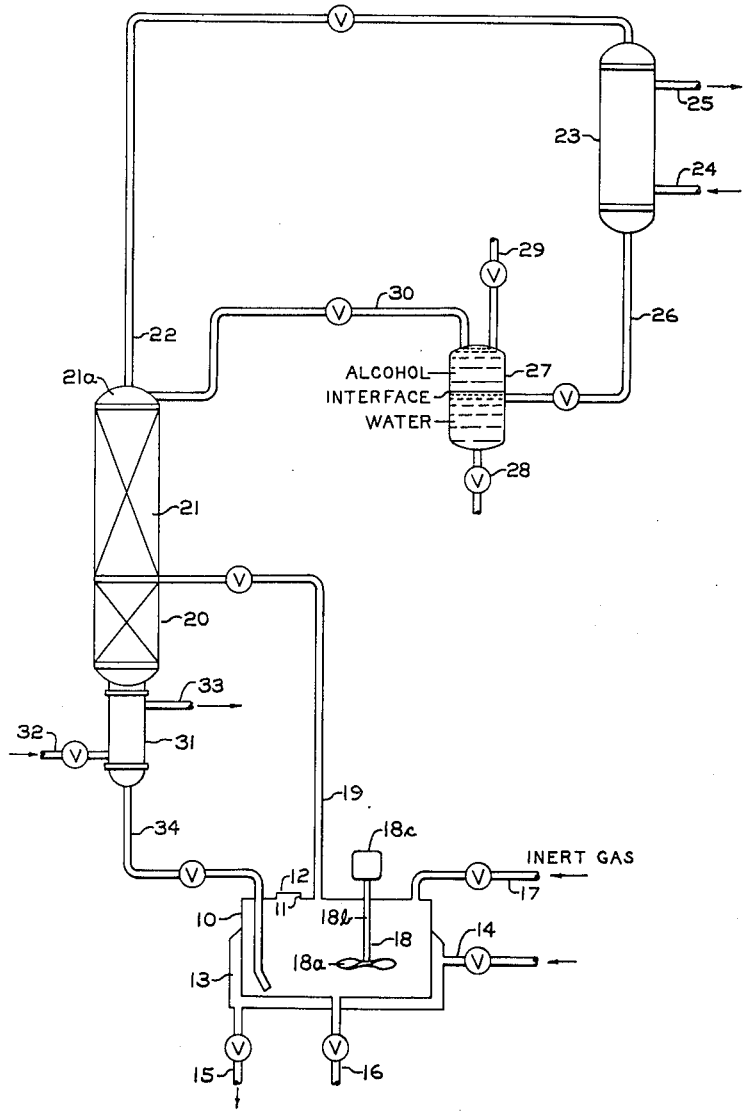

MANUFACTURE OF ALKYLATED UREA OR MELAMINE FORMALDEHYDE WITH IN-PROCESS ALCOHOL RECOVERY

This is a division, of application Ser. No. 541,744, filed Jan. 17, 1975.

BACKGROUND OF THE INVENTION

The preparation of alkylated urea or melamine formaldehyde resins is well known in the art. Thus, these resins are produced by reacting the urea or melamine with the formaldehyde under neutral or alkaline conditions to form the methylol derivatives followed by alkylation (i.e., etherification) with the alcohol under acidic conditions. As is well known, these are condensation reactions which are attended by the evolution of significant amounts of water. Since the reactions are reversible, it is necessary to remove the water from the reaction zone as it is formed if a reasonable degree of completion of the reaction is to be attained. This is accomplished by well known azeotropic distillation procedure, that is, the reaction mixture is heated to reflux and the water removed azeotropically. In conventional commercial practice, the mixture of alcohol and water vapors produced during the reaction are passed out of the reaction zone to a condenser which produces a liquid condensate consisting of an alcohol rich phase and a water rich phase, following which the alcohol rich and water rich phases are separated in known manner with the alcohol rich phase being returned to the reaction zone and the water rich phase being removed to drainage or to storage for additional processing or use if desired. However, one major problem with such conventional commercial processes has been the lengthy production times involved in producing the resins. We have found that the lengthy reaction times involved in producing these resins by present commercial processes is principally related to the water content of the alcohol being returned to the reaction zone. Thus, due to the solubility of water in alcohol, for example, water is soluble in n-butanol to the extent of 20 percent at 25° C., the alcohol being returned to the reaction zone in percent processes is "wet", i.e., it contains a significant quantity of water. The water in this returning wet alcohol causes a significant depression in the reaction rate. In fact, we have found a significant relationship between the overall reaction times and the water content of the alcohol returning to the reaction zone. For example, we have found that when the water content of the returning alcohol ranges from 16 to 20 percent as is typical in present commercial processes, the reaction time ranges from about 6 to about 18 hours whereas when the water content of the returning alcohol is reduced to 1 percent or less the reaction time is cut in most cases as much as 50 percent and in some instances up to 70 percent.

In accordance with the present invention, we have discovered an apparatus system which is capable of returning substantially dry alcohol (i.e., water content 1 percent or less) to the reaction zone, thereby attaining a reduction in reaction time of 50 percent or more.

DETAILED DESCRIPTION OF THE INVENTION

This invention relates to an apparatus system therefor for producing alkylated urea and melamine formaldehyde resin which returns substantially dry alcohol to the reactor, thereby resulting in a substantial reduction (e.g., 50 percent or more) in total reaction time.

In accordance with the provisions of this invention, these and other advantages are attained by the application of the following steps:

A. heating and concomitently agitating a reaction mixture comprising urea or melamine, formaldehyde and an alcohol having a boiling point higher than the boiling point of water, said reaction attended by the evolution of and evaporation of water and the evaporation of a portion of the alcohol thereby forming a mixture of alcohol and water vapors;

B. the mixture of alcohol and water vapors produced during the reaction is passed to a fractionating zone. As illustrated in the drawings, the vapors are passed to the juncture of the rectifying and stripping section of a packed refractionating column, which preferably is packed with material such as Beryl saddles, Intalox saddles, Raschig rings, or with bubble plates or other suitable packing material. The degree of packing may be such as to give at least one theoretical plate of separation to the column. There is no particular upper limit to the number of plates other than those arising from costs. The temperature of the column varies somewhat from the bottom to the top of the column with the temperature at the top of the column being lower than at the bottom. The temperature of the column is controlled by the temperature of the incoming vapors and by heat added by a reboiler (described hereinafter) attached to the bottom of the column. The temperature of the column will become substantially constant as the reaction proceeds to its conclusion and will, in general, as indicated depend upon the temperature of the vapors entering the column as well as heat added from the reboiler.

C. the mixture of alcohol and water vapors is then passed upwardly through the column to a condenser in which a liquid condensate consisting of an alcohol rich phase and a water rich phase forms;

D. the resultant phases are then separated by means of a standard separator device, such as, for example, an azeotropic decanter separator;

E. the alcohol rich phase which is "wet", that is, it initially contains a significant quantity of water (e.g., 16 to 20 percent) is returned from the decanter to the top of the column by means of gravity or, optionally, a pump. In regard to the amount of water in the wet alcohol phase, it should be observed that the precise quantity will, of course depend upon the specific alcohol employed and the solubility of water therein and also upon the formaldehyde source utilized, e.g., Formalin, paraformaldehyde, Formcels, etc. It will be further noted that the quantity of water in the returning alcohol diminishes as the reaction approaches completion. The water phase is removed from the bottom of the decanter to storage, or drain, as desired. The returning wet alcohol then enters the fractionating zone, i.e., the column as reflux contacting the vapors rising through the column. As the returning alcohol contacts the rising vapors and passes downwardly through the column, separation of at least a portion of the water from the returning wet alcohol is obtained;

F. the returning alcohol is then passed through the bottom of the column to a heated reboiler attached thereto. The reboiler may be heated by oil, stem, Dowtherm, and the like. The reboiler is maintained at a temperature just below the boiling point of the alcohol, since higher temperatures may cause complete revaporization of the alcohol. Thus, most of the water remaining in the returning alcohol is stripped off in the reboiler, producing substantially dry alcohol (i.e., 1 percent of less) and the resultant substantially dry alcohol is then passed from the reboiler to the reactor.

As an alternative to the above process, the mixture of alcohol and water vapors produced in the reaction zone (i.e., step (A)) can be passed directly to the condenser (i.e., step (C)) thereby omitting the first pass through the fractionating zone (i.e., step (B)). The remainder of this alternate process then proceeds substantially as indicated in steps (C) through (G) above except that in step (C) the vapors are not passing through the column to the condenser but directly from the reaction zone to the condenser and in step (E) the alcohol rich or "wet" alcohol phase is not being returned from the decanter to the column but is being passed through the column for the first time and the wet alcohol does not contact rising alcohol and water vapors. As will be apparent from the drawing (described in detail below), this can be readily accomplished by closing the valve on line 19 and passing the vapors directly to the condenser by means of a separate line (now shown) which intersects line 22 leading to the condenser. This alternative process while not as efficient as the principal process set forth above does result in faster reaction times than the conventional commercial processes described above.

As indicated above, alkylated urea or melamine formaldehyde resins are prepared by reacting urea or melamine, formaldehyde and alcohol under heat and with the concomitant evolution of water. As is apparent from the above discussion, the removal of water from the reaction zone and from the returning alcohol is of great significance in attaining relatively fast reaction times. Accordingly, control of the total water content of the reaction system is also significance. In addition to the water produced during the condensation reaction which is the principal source of water in the system, the total content of the resin system is influenced by the choice of the formaldehyde source. Thus, formaldehyde is available in several known forms such as, for example, paraformaldehyde flakes, Formalin, Formcels and the like. As is well known, formaldehyde sources such as the Formalins contain significant quantities of water, e.g., about 40 to 63 percent, while paraformaldehydes contain about 5 to 9 percent water and the Formcels from about 6 to 8 percent water. Accordingly, to minimize the effects of externally added water on the resin system, a formaldehyde source such as paraformaldehyde or the butyl Formcels, i.e., n-butyl Formcel, isobutyl Formcel, and the like should be utilized.

For a better understanding of the invention, reference may now be made to the acompanying drawing in which the single FIGURE is a diagrammatical representation of apparatus suitable for use in the practice of this invention.

In this apparatus is provided a suitable reaction vessel, such as a reactor 10 having charging means represented by a hatch 11 with a lid 12 that will allow raw materials to be introduced into the vessel prior to starting the reaction run or during the run. Any means which will transfer energy to the reaction vessel may be employed to heat the mixture in the reactor. Examples of such means are represented by direct gas fire to the vessel, radiant heat, direct electrical heat, circulating fluids such as Arochlor, condensing vapors such as Dowtherm, steam and the like. For purposes of illustration is shown a heating jacket 13 through which heating media, such as one of those mentioned above, may be circulated. The jacket 13 is provided with an appropriate inlet and outlet for the circulating heating media as indicated by 14 and 15 respectively. The reactor is also provided with an outlet 16 for discharge of resin product, and an inlet 17 so that an inert gas such as $CO_2$. $N_2$ and the like may be employed to purge the reaction vessel prior to charging the reactor. Obviously, the several inlets and outlets may be provided with valves V by means of which the flow of liquids or inert gases may be regulated.

Means to agitate the charge within the reactor comprises a mechanical stirrer 18 with an impellor 18a, a shaft 18b and a motor 18c.

The reactor 10 is further connected by a vapor line or conduit 19 to the juncture of the rectifying and stripping sections of a column 20 of conventional design, which as diagrammatically indicated at 21, is suitably packed with Intalox saddles, bubble plates or other packing to provide at least one plate of separation.

A vapor line or conduit 22 leads from section 21a to a condenser 23 having appropriate cooling means, such as conduits (not shown) through which a cooling medium may be circulated by means of inlet 24 and outlet 25 in order to condense the components of the vapor mixture.

Condensate from the condenser passes through a line or conduit 26 to a decanter separator device 27 in which the condensate consisting of a wet alcohol phase, shown on the diagram as the liquid in the top portion of the decanter, and a water phase, shown in the diagram as the liquid in the bottom portion of the decanter, is collected. The dark line between the liquid phases represents the interface between the alcohol and water phases.

The decanter separator device 27 is provided with an outlet line 28 for draining off water, either continuously or intermittently and a pressure valve 29. The decanter device 27 is connected by line or conduit 30 to the top of column 20 at section 21a so that as the decanter fills the alcohol overflows through line 30 and passes by means of gravity or, optionally a pump entering at the top 21a of column 20 as reflux and thence passes downwardly through the column. It should be noted here that ordinarily during the start up of the process the decanter 27 is filled with alcohol so that as the reaction begins alcohol is being returned to the reactor as it is consumed. As the process proceeds and attains steady state conditions, the liquid in the decanter consists of the phases shown in the diagram. The decanter 27 may be further equipped with devices such as a sight glass (not shown) or the like so that the level of liquid in the decanter can be ascertained. Line or conduit 26 from the condenser and line or conduit 30 from the decanter may contain valves V so that the lines may be closed or opened as desired.

Attached to the bottom of column 20 is a heated reboiler 31 which may be of conventional design. The reboiler has a circulating means such as conduits (not shown) and is provided with an appropriate inlet and outlet for the circulating heating means, as indicated by 32 and 33 respectively. As will be apparent, the reboiler 31 may be provided with a valve V for controlling the flow of heating medium and may further be equipped with an appropriate heating means (not shown) such as an electrical heating coil and the like. The reboiler 31 may also be provided with a temperature measuring means (not shown) such as a thermometer or preferably a thermocouple. In this element of the apparatus, the alcohol returning downwardly through column 20 from the decanter 27 is stripped of a portion of the remaining water to produce substantially dry alcohol. Accordingly, it is important that the temperature of the reboiler 31 be controlled such that the temperature is maintained below the boiling point of the alcohol. Thus, for example, in the case of n-butanol (normal boiling point 244° F.), the temperature of the reboiler is controlled such that the temperature of the n-butanol therein does not exceed about 240° F.

The reboiler 31 is connected to reactor 10 by a line or conduit 34 which extends into the reactor and into the reaction mixture. As diagrammatically illustrated in the drawing, line 34 extends to a point just above the bottom of the reactor. This is a preferred feature since as the substantially dry alcohol from the reboiler 31 passes back into the reactor by means of line 34, it is relatively hot and aids in promoting a more rapid reaction. As indicated, the reboiler 31 amd line 34 may be provided with valves V which may be opened or closed as desired.

The apparatus as illustrated may be provided with thermometers or thermocouples, or other appropriate measuring devices whereby the temperature at various points in the system may be observed in conventional manner. Pumps and other devices for promoting flow of fluids may be added. It will be recognized that the water in the decanter separator 27 may contain a small proportion of alcohol (e.g., butanol is soluble in water to the extent of about 9 percent at 15° C.). Accordingly, if desired, the water phase from the decanter can be removed to storage and then subjected to distillation or the like to recover the alcohol for reuse.

The following constitute examples illustrating the practice of the invention.

EXAMPLE 1

This example illustrates the preparation of a butylated melamine formaldehyde resin utilizing the apparatus of this invention.

Prior to charging the reactor 10, the decanter 27 was filled with n-butanol. During this run, the packed column 20 was operated at atmospheric pressure.

The initial charge to the reactor 10 comprised 6.0 moles of n-butanol and 5.5 moles of formaldehyde as n-butyl Formcel (approximately 40 percent formaldehyde, 53 percent n-butanol, 7 percent water). After introducing the initial charge, the reactor is purged with $N_2$. The acid number of the initial charge mixture is then adjusted to about 0.30 to 0.35 with formic acid, following which 1.0 mole of melamine was added to the reactor. The reaction mixture was then heated to reflux (about 215° F.). During the initial stages of the reaction, it will be recognized that little if any heat was being supplied to column 20 by the vapors passing there through. However, as the reaction in the reactor attains headway and hot vapors continue to rise through the column from the reactor 10 and from the reboiler 31 they will supply heat thereto.

As the reaction is initiated and proceeds, the mixture of n-butanol and water vapors pass from the reactor 10 to the column 20 by means of line 19. The vapors then proceed upwardly from column 20 to condenser 23 by means of line 22 where they are condensed. The liquid condensate from the condenser 23 then passes to decanter separation device 27, which has previously been filled with n-butaonl, by means of line 26, causing the butanol to overflow through line 30 to the top of column 20 at section 21a. As the reaction proceeds, the composition of the liquid in the decanter consists of two phases, one a "wet" butanol or butanol rich phase which contains a significant proportion of water (i.e., from about 16 to about 20 percent) and a water or water rich phase containing a minor proportion of n-butanol (i.e., about 8 to 9 percent). It should be noted that in the process as illustrated in this example the alcohol returns to the top of the column by means of gravity. However, a pump can also be utilized if desired. The wet butanol returning to the top of column 20 and section 21a contacts the upcoming mixture of n-butanol and water vapors whereupon at least a partial separation of water from the wet butanol likely begins. The returning alcohol then passes downwardly through column 20 to the reboiler 31. In this example the reboiler was heated by means of circulating oil with the reboiler oil thermostat set at a temperature of about 260° F. At this thermostat setting, the temperature of the n-butanol from the reboiler was maintained at about 235° F., which is below its normal boiling point (i.e., 244° F.). In the reboiler 31, additional water is stripped from the returning n-butanol, thereby producing substantially dry n-butanol (i.e., n-butanol containing 1 percent or less water). In this particular run, reflux of the reaction mixture was continued until a sample of the resin in the reactor showed a naphtha tolerance of about 370 and a Gardner-Holdt viscosity of G+, which was considered to be the end point of the reaction. A sample of n-butanol returning to the reactor from the reboiler during the process was analyzed and found to contain about 0.5 percent water. Total azeotrope time in this run was 3 hours. (The term "azeotrope time" used herein refers to the time period from the start of reflux to the naphtha tolerance end point.)

In order to compare the reaction times of the process of this invention with a standard process for preparing butylated melamine formaldehyde resins a second run was made. In the second run, the same reaction mixture was charged to reactor 10. However, in this run, the lines to the packed column 20 and reboiler were closed by closing appropriate valves and vapors from the reaction mixture mixture were passed directly to the condenser 23 by means of a separate line (not shown on the drawing), the resultant liquid condensate then passed to decanter separator device 27 by means of line 26, as above, and the separate n-butanol passed from the decanter directly to the reactor 10 by means of a separate line (also not shown). Reflux of the reaction mixture was continued as above until a sample of resin in the reactor showed substantially similar naphtha tolerance and viscosity values. Samples of n-butanol returning to the reactor 10 from the decanter 27 were analyzed and found to contain from 16 to 20 percent water. Total azeotrope time by this standard process was about 9 hours. Thus, in this example, the use of the apparatus of this invention resulting in a 70 percent reduction in reaction time compared to the reaction time of a standard process.

EXAMPLE 2

In this Example, Example 1 was repeated except that the reaction charge consisted of 1.0 moles of melamine, 6.5 moles of n-butanol and 6.0 moles of formaldehyde. The run was made using the same conditions and process techniques as in Example 1. As in Example 1, reflux was continued until a sample of resin from the reactor showed naphtha tolerance and viscosity values substantially the same as those disclosed in Example 1. A sample of n-butanol returning to the reactor from the reboiler was analyzed during the process and found to contain 0.3 percent water. Total azeotrope time of the run was 2¾ hours which again shows a substantial reduction (e.g., about 70 percent) from the azeotrope time of the standard process.

EXAMPLE 3

This example illustrates the preparation of butylated urea formaldehyde resin utilizing the apparatus of this invention.

In this example, substantially the same process techniques and conditions (i.e., reboiler temperature, packed column pressure, etc.) were employed as in Example 1.

The initial reaction charge consisted of 1.0 moles of urea, 1.6 moles of n-butanol, 2.2 moles of formaldehyde as n-butyl Formcel, and a sufficient quantity of NaOH to adjust the pH of the mixture to a range of 8.5 to 9.0. The reaction mixture was heated to reflux (about 210° F.) over a period of about 1 hour and then held at reflux for about 45 minutes, following which the reaction mixture was cooled to about 190° F. and a sufficient quantity of an approximately 64 percent aqueous solution of phosphoric acid was added to the reaction mixture to adjust the pH of the mixture to a range of 3.0 to 4.0. The reaction mixture was then again heated to reflux and refluxing continued until a sample of resin from the reactor showed a naphtha tolerance of about 130 and a Gardner-Holdt viscosity of Z1-Z2 at which time the reaction was considered to be complete. Total azeotrope time in this run was about 4.5 hours. A second or duplicate run was then made and the azeotrope time was 4½ hours. During the first run, a sample of n-butanol returning from the reboiler to the reactor was analyzed and found to contain 0.3 percent water.

In order to compare the apparatus employed in this example with the standard process, a third run was made in which the packed column and reboiler were bypassed as in Example 1. Total azeotrope time in this third run was about 8 to 9 hours, which again illustrates the substantial reduction in reaction time achieved by the process and apparatus system of this invention.

EXAMPLE 4

This example illustrates the use of the alternate process of this invention.

The apparatus system used in the runs of this example was substantially the same as utilized in Examples 1-3 except that line 19 leading to packed column 20 was closed by closing the valve thereon and a separate line (not shown) leading from the reactor to line 22 was employed so that vapors from the reaction zone could be passed directly to the condenser 23 thereby omitting the first pass through the packed column.

The initial charge to the reactor 10 was the same as that employed in Example 2 and initial processing (i.e., nitrogen purging, pH adjustment, heat to reflux, etc.) was the same. The mixture of n-butanol and water vapors produced during the reaction was then passed directly to the condenser by means of the separate line referred to above. The reminder of the process then proceeded as in Examples 1 and 2 with separation of the wet butanol and water rich phases in decanter separation device 27 followed by passage of the wet alcohol from the decanter through line 30 to the top of Column 20 at section 21a and down through Column 20 to reboiler 31 and finally from the reboiler to the reactor 10. As in Examples 1 and 2, reflux of the reaction mixture was continued until a sample of resin in the reactor showed substantially similar naphtha tolerance and viscosity values. Samples of n-butanol returning from the reboiler to the reaction in this alternate process were analyzed and found to contain 8-12 percent water. Total azeotrope time by this alternate process was 4 hours. This compares to 2¾ hours by the principal process, as illustrated in Example 2, and about 9 hours by standard processes. Thus, this alternate process, while not as efficient as the principal process, nevertheless represents an advantage over the standard process.

According to the provisions of the Patent Statutes, there are described above the invention and what are now considered to be its best embodiments. However, within the scope of the appended claims, it is to be understood that the invention can be practiced otherwise than as specifically described.

We claim:

1. An apparatus for preparing alkylated urea or melaimine formaldehyde resins from an alcohol having a boiling point higher than the boiling point of water comprising:
   a. reactor having heat and agitating means;
   b. a fractionating column having at least one theoretical plate of separation, and having a rectifying section above a stripping section;
   c. first conduit means for passing a mixture of said alcohol and water vapor from said reactor to the junction of the rectifying section and stripping section of said column;
   d. reboiler means connected to the bottom of said column, said reboiler having controls adapted to maintain a temperature below the boiling point of said alcohol;
   e. second conduit means connecting said reboiler and said reactor and adapted to return alcohol from said reboiler to said reactor;
   f. a condenser having coolant circulating means;
   g. third conduit means connecting rectifying section of said column to said condenser and adapted to pass a mixture of said alcohol and water vapor from said rectifying section to said condenser;
   h. a phase separator device capable of separating an alcohol phase comprising said alcohol from a water phase, said separator having an outlet at the bottom thereof for removing the water phase;
   i. fourth conduit means connecting said phase separator to said condenser and adapted to pass a condensed mixture of said alcohol and water from said condenser into said separator;
   j. fifth conduit means connecting the top portion of said phase separator to the top portion of said column and adapted to pass the alcohol phase from said separator into the top portion of said column.

2. The apparatus of claim 1 wherein said phase separator device is a decanter separator.

3. The apparatus of claim 1 further including a pump operably associated with said fifth conduit means adapted to pass said alcohol phase to said column.

* * * * *